United States Patent [19]
Kojima et al.

[11] Patent Number: 5,790,358
[45] Date of Patent: Aug. 4, 1998

[54] FEEDING PASS SWITCHING CIRCUIT

[75] Inventors: Junichi Kojima; Kenichi Asakawa; Naoki Norimatsu; Hitoshi Nishikawa, all of Tokyo, Japan

[73] Assignee: Kakusai Denshin Denwa Kabushiki Kaisha et al., Tokyo, Japan

[21] Appl. No.: 768,593

[22] Filed: Dec. 18, 1996

[30] Foreign Application Priority Data

Dec. 21, 1995 [JP] Japan ................................. 7-349043

[51] Int. Cl.$^6$ ................................. H02H 3/00
[52] U.S. Cl. ................ 361/63; 361/187; 361/191; 361/210; 307/127
[58] Field of Search ............... 361/62–63, 65, 361/67, 170, 187, 191, 210, 166; 307/116, 127, 130, 131

[56] References Cited

U.S. PATENT DOCUMENTS 5,334,879  8/1994  Inoue et al. ................. 307/112

*Primary Examiner*—Jeffrey A. Gaffin
*Assistant Examiner*—Michael J. Sherry
*Attorney, Agent, or Firm*—Pollock, Vande Sande & Priddy

[57] ABSTRACT

When a trouble occurs in a cable, a feeding pass for another cable is ensured. In a feeding pass switching circuit, optical fibers are respectively connected to the terminals A, B and C. When a negative current is applied to the system in a state where a BRANCH2 is put in an open circuit and a TRUNK is grounded, a relay K1 is activated, and then a relay K2 is activated. Successively, when a positive current is supplied from the TRUNK, a cable connected to the TRUNK and a BRANCH1 is fed from both terminals. When the positive current is supplied from the BRANCH1 in a state where the TRUNK is put in a open circuit and the BRANCH2 is grounded, a relay K3 is activated. Successively, when the negative current is supplied to the BRANCH2, a relay K5 is activated. In such a manner, the power is fed to each feeding pass from one terminal.

2 Claims, 5 Drawing Sheets

FEEDING PASS SWITCHING CIRCUIT

BACKGROUND OF THE INVENTION

1. Field of the Invention

The present invention relates to a feeding pass switching circuit for switching feeding passes with respect to repeaters or branching units installed on a transmission network in a long distance optical transmission system such as a submarine optical cable transmission system.

2. Description of the Related Art

A submarine optical cable system can perform a long distance digital transmission having a large capacity owing to a transmission loss factor or wideband property of an optical fiber, especially, a plurality of optical fiber pairs can be accommodated in submarine optical cables, leading to an advantage that the optical fiber pairs are branched per unit in the sea, thereby connecting a plurality of land stations. Accordingly, the submarine optical cable system can achieve a multi-point structure connecting three or more terminal stations (hereinafter referred to as land stations) regardless of a point-to point structure. An example of such a submarine optical cable system is illustrated in FIG. 4.

In FIG. 4, denoted by T1 to T6 are land stations installed on the land. 1 to 5 are submarine optical cables for connecting between each of the land stations T1 to T6. C1 to C13 are optical repeaters which are respectively inserted into the submarine optical cables 1 to 5 at an interval of, e.g., about 10 Km. BU1 to BU4 are branching units for branching signals transmitted in one submarine optical cable into a plurality of optical cables in this case. As illustrated in FIG. 4, a main submarine optical cable 1 is installed between the land stations T1 and T4 in this example, and the submarine optical cables 2 to 5 are respectively branched from the branching units BU1 to BU4 which are inserted into the submarine optical cable 1 with respect to the other land stations T2 to T6. With such an arrangement, the transmission between each land station is performed.

Power must be fed from power feeding units of the land stations T1 to T6 to the optical repeaters C1 to C13 and the branching units BU1 to BU4 of the submarine optical cable system having such an arrangement. The power is supplied or fed utilizing copper tubes of the submarine optical cable or high tensile strength piano wires. The power feeding or feeding system adopts a one time terminal feeding system (hereinafter referred to as a one terminal feeding system) for feeding power from one power feeding unit of one land station alone and a dual terminal feeding system (hereinafter referred to as a two terminal feeding system) for feeding power from the power feeding units of two land stations; a two terminal feeding system is normally adopted for a long distance transmission.

Broken lines in FIG. 4 show one example of such a feeding pass. In this example, power is fed to the optical repeaters C1, C2, C4, C6, C9, C10, C13 and the branching units BU1 to BU4 respectively provided in the submarine optical cable 1 connecting between the land stations T1 and T4 by way of a two terminal power feeding system having a positive electrode at the land station T1 and a negative electrode at the land station T4.

Further, the submarine optical cable 2 is grounded to sea water by way of an electrode provided in a casing of the branching unit BU1, and the power supply voltage (hereinafter referred to as feeding voltage) having negative polarity is supplied to the circuit from the land station T2 so that the power is fed from the land station T2 to the optical repeater C3 inserted into the submarine optical cable 2 by way of the one terminal feeding system. Likewise, the power is also fed to the submarine optical cable 3 between the branching unit BU2 and the land station T3, the submarine optical cable 4 between the branching unit BU3 and the land station T5, and the submarine optical cable 5 between the branching unit BU4 and the land station T6 by way of the one terminal feeding system from the land stations. Meanwhile, the reason for grounding the electrode to sea water is to prevent the electrode per se from being broken down and corroded due to an electrolytic reaction.

In the submarine optical cable system having such an arrangement, there are provided feeding pass switching circuits for switching the feeding pass in each of the branching units BU1 to BU4 to ensure a transmission pass using other submarine optical cables in case one of the submarine optical cables is troubled. Since the branching units BUs are installed in the seabed, the feeding pass switching circuit is realized by elements having high reliability such as vacuum relays activable by the power supply current (hereinafter feeding current).

FIG. 5 shows an example of such a feeding pass switching circuit, wherein A, B and C are respectively terminals to which optical cables are connected, and the optical cables are connected to power feeding units of the land stations by way of optical repeaters. E is a ground terminal connected to sea water as mentioned above. K1 and K2 are relays for use in high voltage such as vacuum relays, and k1 and k2 are respectively contacts of the relays K1 and K2. Each contact of the relays is connected to "1" in its initial state, and it can be switched to "2" when the relays are activated.

When the submarine optical cable system is started up using such a feeding pass switching circuit, a land station connected to the terminal A is first grounded, and a land station connected to the terminal C is put in an open circuit. Further, a negative feed voltage is applied to the system from the land station connected to the terminal B. Thereafter, there is supplied a power supply current (hereinafter referred to as feeding current) in proportion to the feed voltage to the relay K1, and when the feed voltage is gradually increased the contact k1 is switched to "2" when the feeding current exceeds a predetermined value so that the terminal C is grounded to the sea water by way of the terminal E. Successively the positive feed voltage is applied to the system from the land station connected to the terminal A. Accordingly, the cable connected to the terminal A and the cable connected to terminal B are subject to the two terminal feeding system from the land stations connected to the terminals A and B. Further, in the state when the negative feed voltage is applied to the circuit from the land station connected to the terminal C, the feed current flows from the ground to the terminal C by way of the relay contacts k1 so that the power is fed from the land station connected to the terminal C to the cable connected to the terminal C by way of the one terminal feeding system. In such a manner, the feeding system can be controlled depending on a manner of application of the voltage when the system is started up.

In case of the two terminal feeding system condition where the power is fed from the terminals A and B and in case of the one terminal feeding system condition where the power is fed from the ground to the terminal C by way of the terminal E, suppose that the feed current does not flow when the submarine optical cable connected to the terminal B is troubled. At this time, the feed current does not flow to the relay K1, and the contact k1 of the relay K1 is returned to "1" so that one end of the relay K2 and the terminal C are connected to each other. As a result the current flows from the terminal A to the terminal C so that the relay K2 is activated to permit the circuit to be in the two terminal feeding system condition where the power is fed from the terminals A and C. At this time, the terminal B is grounded by way of the terminal E.

In case of the two terminal feeding system condition where the power is fed from terminals A and C, and in case of the one terminal feeding system condition where the power is fed from the ground to the terminal B by way of the terminal E, the feeding passes are switched likewise in the same manner as set forth above even in the case where the submarine optical cable connected to the terminal C is troubled.

In the feeding pass switching circuit as illustrated in FIG. 5, the potentials of the terminals C and B, and the contact k1 in the vicinity thereof become substantially 0 volts, but the potentials of the terminals A and B and the relay K2 in the vicinity thereof become values other than 0 volts in the case of the two terminal feeding system condition where the power is fed from the terminals A and B and in the case of the one terminal feeding system condition where the power is fed from the terminal E to the terminal C. Accordingly, when the feed current does not flow due to a malfunction at the terminal A or terminal B, the contact k1 is restored to the "1" but an arc discharge current is generated in the contact k1, thereby causing contact trouble. Accordingly, a feeding pass switching circuit has been proposed for preventing the system from being switched in such a high voltage application state (see JP-A 63/189025).

According to the conventional feeding pass switching circuit shown in FIG. 5, when the submarine optical cable connected to the terminal B is troubled and the cable connected to the terminal C is troubled, transmission between other submarine optical cables can be ensured by switching the feeding passes. However, power cannot be fed between the terminals B and C, and hence terminals B and C cannot be connected to each other even if the feeding passes are switched to other ones when the cable connected to the terminal A is troubled.

Accordingly, it is an object of present invention to provide a feeding pass switching circuit capable of feeding power to any cable of three cables connected to the branching units BUs, thereby ensuring that power is fed to the other two cables even if one cable is troubled.

SUMMARY OF THE INVENTION

To achieve the above object, a feeding pass switching circuit according to the present invention includes three terminals respectively connected to a feeding pass. The switching current is provided with a relay connected between a first terminal and a second terminal and activated by a current flowing in one direction, another relay is connected between the second terminal and a third terminal and activated by a current flowing in either direction, and one more relay is connected between the first terminal and the third terminal and activated by a current flowing in one direction. The feeding pass circuit is capable of ensuring a feeding path for any two cables, using a feeding pass which is not troubled, by selectively activating the above relays.

According to the present invention, either of the optical fibers respectively connected with any of the first through third terminals can be supplied with electric power, so that a feeding pass circuit is provided which ensures a feeding path for the other cables even when one cable is in trouble.

DESCRIPTION OF THE PREFERRED EMBODIMENT

Figure 1:
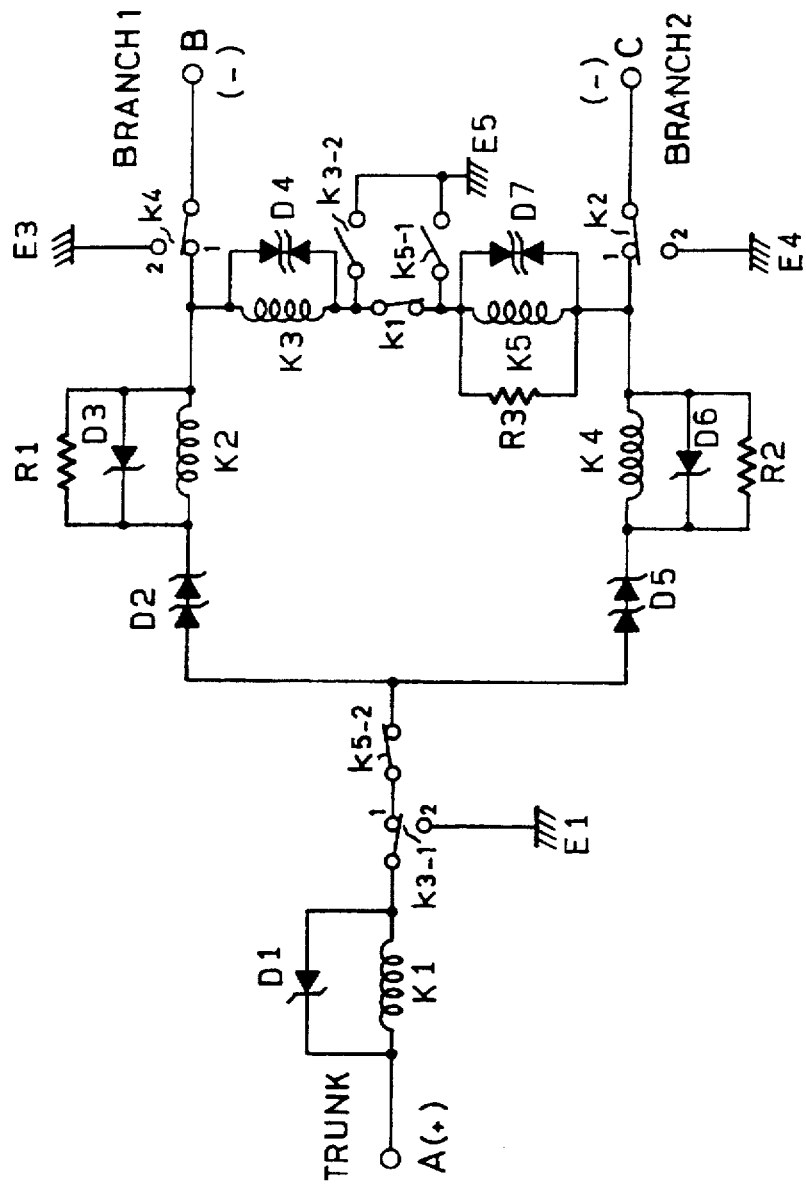
FIG. 1 is a view showing a feeding pass switching circuit according to a first embodiment of the invention.

First Embodiment (FIGS. 1 and 2)

FIG. 1 shows a feeding pass switching circuit according to a first embodiment of the present invention. A, B and C are respectively terminals of the feeding pass switching circuit to which submarine optical cables are respectively connected. Suppose that an optical cable connected to the terminal A is a TRUNK, an optical cable connected to the terminal B is a BRANCH1, and an optical cable connected to the terminal C is a BRANCH2. K1 to K5 are first to fifth relays comprising vacuum relays, etc., k1, k2, k3-1, k4, k5-1 and k5-2 are respectively contacts of these relays K1 to K5. The contacts of these relays K1 to K5 are in an initialized state in FIG. 1, i.e., a state where no current flows. As shown in FIG. 1, all paths are connected to one another in the initialized state so as to carry out an insulation test, etc. D1 to D7 are Zener diodes, R1 to R3 are resistors. Further, E1 to E5 are ground terminals connected to the sea water by way of a housing of the feeding pass switching circuit.

Zener diodes D1, D3 and D6 are respectively connected in parallel with the relays K1, K2 and K4 to limit the voltage to be applied to both ends of the relays K1, K2 and K4 when the current flows from the terminal A to the terminal B or C, and to prevent the relays K1, K2 and K4 from being activated by a current flowing in the opposite direction, namely, from the terminal B or C to the terminal A. The reason that the Zener diodes D4 and D7 are connected in parallel with the relays K3 and K5, and are respectively connected in series with each other in an opposite polarity direction, is that the relays K3 and K5 can be activated by a current flowing in either direction and the voltage to be applied to both ends thereof can be limited. The resistors R1, R2 and R3 are respectively connected in parallel with the relays K2, K4 and K5 to permit a current flowing to the relays to be divided to make the sensitivity of the relays K2, K4 and K5 lower than that of the relays K1 and K3. The resistance values of these resistors R1, R2 and R3 are substantially the same as the resistance value of the windings of the relays.

The Zener diodes in FIG. 1 respectively have the same Zener voltage which is slightly greater than an operation voltage of the relays K1 to K5.

Although the Zener diodes D2 and D5 comprise a plurality of diodes which are connected in series to one another, it is not necessary that they comprise such a plurality of diodes connected in series, and they may comprise ordinary diodes provided desired Zener voltages can be obtained.

A-1: Start-up Procedure in Normal Operation:

When the system is started up using the feeding pass switching circuit having the arrangement shown in FIG. 1, land stations apply the feed voltage in association with one another so as to feed power to the optical repeater groups and the branching units per se respectively inserted into the optical cables using various feeding methods. The manner of placing the system in operation will be now described.

A-1.1. Feeding TRUNK-BRANCH1:

Supposing that the power is fed from the TRUNK of the terminal A and the BRANCH1 of the terminal B and another power is fed from the BRANCH2 of the terminal C, the terminal C (BRANCH2) in the land station connected to the terminal C is first put in an open circuit, and the terminal A (TRUNK) in the land station connected to the terminal A is grounded. A negative voltage is gradually applied from the land station connected to the terminal B (BRANCH1). As a result, current starts to flow from the grounded terminal A (TRUNK) to the terminal B (BRANCH1) by way of two current passes, i.e., a first current pass through which the current flows in the order of the relays K1 and K2 and another current pass through which the current flows from the relay K1 to the relays K4, K5 and K3. At this time, since the relays K4, K5 and K3 are connected in series with one another, the current flowing through the relays K4, K5 and K3 becomes smaller than that flowing through the relay K2. Accordingly, the relay K1 is activated first, so that the contact k1 thereof is put in an open circuit. As a result, the current path through which the current flows to the relay K3 is put in an open circuit. Since at this time the resistance value of the circuit becomes high, the current flowing through the relay K1 is reduced instantaneously so that the relay K1 must have a hysteresis property to prevent the relay K1 from being again in an inactivable state.

Further, when the voltage to be applied to the circuit from the land station connected to the terminal B (BRANCH1) is increased, the relay K2 is activated after the relay K1 is activated. As a result, the contact k2 is switched so that the terminal C (BRANCH2) is connected to the terminal E4 so as to be grounded to the sea water.

Thereafter, a positive voltage is applied to the circuit from the land station connected to the terminal A (TRUNK).

In the manner set forth above, the circuit is in two feeding systems, namely a two terminal feeding system where the power is fed from the terminal A (TRUNK) and the terminal B (BRANCH1) and a one terminal feeding system where the power is fed from the terminal C (BRANCH2).

A-1.2. Feeding TRUNK-BRANCH2:

In the reverse manner, namely, supposing that the power is fed from the TRUNK of the terminal A and the BRANCH2 of the terminal C and another power is fed from the BRANCH1 of the terminal B, the terminal B (BRANCH1) is first open to feed the negative current from the terminal C (BRANCH2). As a result, it is possible for the circuit to be in two feeding systems, namely, a two terminal feeding system where the power is fed from the terminal A (TRUNK) and the terminal C (BRANCH2) and a one terminal feeding system where the power is fed from the terminal B (BRANCH1).

A-1.3. Feeding BRANCH1-BRANCH2:

First the terminal A (TRUNK) is put in an open circuit and the terminal C (BRANCH2) is grounded. Thereafter, a positive current is supplied from the terminal B (BRANCH1). In the state shown in FIG. 1, when the positive voltage is gradually applied to the circuit from the terminal B (BRANCH1), the current starts to flow by way of two current passes, i.e., a first current pass through which the current flows in the order of the terminal B, the contact k4, the relay K3, the contact k1, the relay K5, the contact k2 and the terminal C, and a second current pass through which the current flows in the order of the terminal B, the contact k4, the diode D3, the diode D2, the diode D5, the relay K4, the contact k2, and the terminal C. Meanwhile, since the Zener diode D2, e.g., composed of two Zener diodes connected in series with each other, is interposed on the second current pass in which the current flows through the relay K4, the voltage applied to the relays K2 and K4 is small so that the current scarcely flows.

Since the relay K5 is connected in parallel with the resistor R3, the relay K3 is activated first. Accordingly, the contact k3-2 is made conductive, thereby forming a circuit to be grounded to the ground terminal E5 by way of the terminal B, the contact k4, the relay K3 and the contact k3-2, wherein the relay K3 is put in a self-holding state. Further the contact k3-1 of the relay K3 is also switched to "2", and the terminal A (TRUNK) is connected to the ground terminal E1 by way of the relay K1, and the TRUNK of the terminal A is separated from the BRANCH1 and the BRANCH2.

Further, at this time, since the terminal A (TRUNK) is put in an open circuit, the relay K1 is not activated.

In this state, the negative voltage is applied from the terminal C (BRANCH2) to the system so as to permit the negative current to flow. Accordingly, the current flows through the ground terminal E5, the contact k3-2, the contact k1, the relay K5, the contact k2 and the terminal C so that the relay K5 is activated. As a result, the contact k5-1 is conducted so that the relay K5 is put in a self-holding state and the contact k5-2 is put in an open circuit state.

Then the polarity of the voltage to the applied to the terminal B (BRANCH1) is inverted so as to flow a normal negative current. At this time, the relay K3 is temporarily in an inactivable condition. One end of the relay K3 is connected to the ground terminal E5 and it is permitted again to be in an activable condition owing to the negative voltage to be applied from the terminal B since the relay K5 is activated as set forth above. As a result, the terminal B (BRANCH1) and the terminal C (BRANCH2) are respectively grounded at the ground terminal E5, so that the power is fed from the terminal B (BRANCH1) and the terminal C (BRANCH2). Thereafter, the positive current is permitted to flow from the terminal A (TRUNK). Although the contact k1 is put in an open circuit state when the relay K1 is activated, the condition is not changed.

A-2. Restart Procedure after Trouble:

When trouble occurs on the feeding passes, the land stations are associated with one another so as to restart the system avoiding the optical cables which are troubled. That is, in the feeding system shown in FIG. 2 (A), if trouble occurs in the optical cable branching units BU2 and BU3, the feeding passes are changed as shown in FIG. 2 (B), thereby restarting the system in a manner which avoids the troubled pass. Described now is a manner of restarting the system when there is an open trouble where the cable is broken so that the current does not flow, and when there is a shunt trouble where the cable is grounded to the sea water.

Figure 2A:
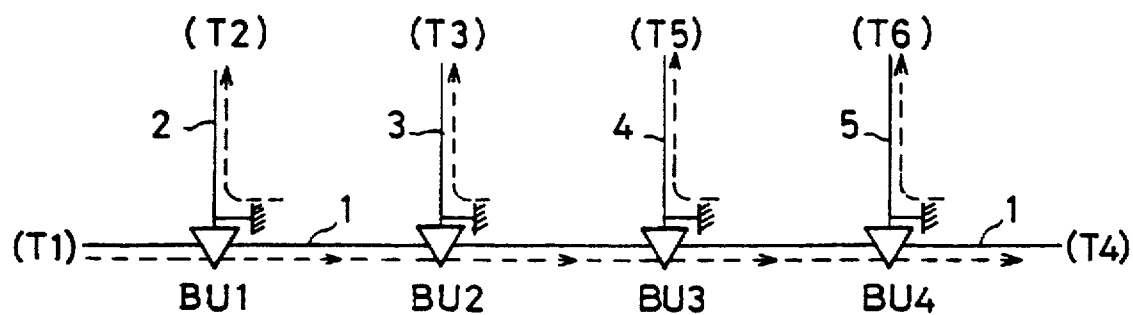
FIG. 2(A) is a view for explaining switching of a feeding pass, at a normal time.
Figure 2B:
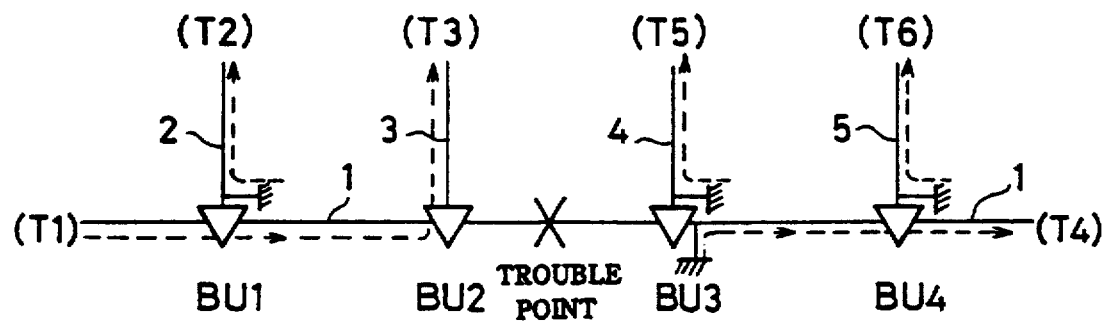
FIG. 2(B) is a view for explaining switching of a troubled feeding pass.

A-2.1. In Case of Open Trouble:

When one of the feeding passes respectively connected to the terminal A (TRUNK), to the terminal B (BRANCH1) or to the terminal C (BRANCH2) is broken, either of the start-up procedures A-1.1 through A-1.3 is employed so that the system is restarted, thereby constituting the feeding pass as shown in FIG. 2(B).

A-2.2. In Case of Shunt Trouble:

A-2.2.1. Shunt Trouble of TRUNK:

In case of shunt trouble in the TRUNK where the TRUNK is short-circuited to the sea water, the terminal C (BRANCH2) is first open so as to supply the positive current needed for the activation of relays using the constant current source from the terminal B (BRANCH1). Most of the current flows to the TRUNK which is grounded to sea water by way of the terminal B, the contact k4, the relay K2, the diode D2, the contact k5-2, the contact k3-1, the relay K1 and the terminal A, but these relays are not activated since the relays K2 and K1 are respectively connected in parallel with the diodes D3 and D1. Part of the current flows to the path formed by the relay K3, the contact k1, the relay K5, the relay K4 and the diode D5, but these relays are not activated since the voltage applied to these relays are controlled by diodes D2, D3 and D5.

In such a condition, the negative voltage is applied from the land station connected to the BRANCH2 of the terminal C so as to flow the negative current from the terminal C. This current flows to the BRANCH1 of the terminal B from the contact k2 mainly by way of the relays K3 and K5. Since the relay K5 is connected in parallel with the resistor R3 and is low in sensitivity, the relay K3 is activated first. Accordingly, the contact k3-2 is made conductive, and it is grounded to the ground terminal E5. As a result, the current flows from the BRANCH1 of the terminal B to the relay K3, and the relay K3 is put in a self-holding state. Further, the contact k3-1 is switched to "2", the TRUNK of the terminal A is connected to the ground terminal E1 by way of the relay K1, and the TRUNK is separated from the branching unit.

On the other hand, when the negative current to be supplied from the BRANCH2 of the terminal C is increased, the relay K5 is activated. Accordingly, the contact k5-1 is made conductive so that one end of the relay K5 is grounded to the ground terminal E5, and hence the relay K5 is put in a self-holding state. Further, the TRUNK is made in a double separated condition by the contact k5-2.

Thereafter the polarity of the current supplied to BRANCH1 of the terminal B is inverted so as to supply a negative current from the BRANCH1. At this time, although the relay K3 is temporarily in an inactivable condition, the connecting point between the relays K3 and K5 remains grounded to the ground terminal E5 and the TRUNK remains separated from the branching unit since the relay K5 is in the activable condition, and this state is not changed.

As shown in detail above, in the case of shunt trouble of the TRUNK, the TRUNK is separated and the power is fed between the BRANCH1 and the BRANCH2.

A-2.2.2. In Case of Shunt Trouble of BRANCH2:

When trouble occurs at the BRANCH2, the BRANCH1 is put in an open circuit state when the system is restarted and the positive current flows from the TRUNK of the terminal A. This current flows to the connecting point of the BRANCH2 by way of the pass formed by the terminal A of the relay K1, the contact k3-1, the contact k5, the diode D5, the relay K4, the contact k2 and the terminal C, and by way of another pass formed by the terminal A, the relay K1, the contact k3-1, the contact k5-2, the diode D2, the relay K2, the relay K3, the contact k1, the relay K5, the contact k2 and the terminal C. However, since the current flowing to the relays K2, K3 and K5 is very small, and the relay K4 is made low in sensitivity by the resistor R2, the relay K1 is activated first. Accordingly, the contact k1 is put in an open circuit state. At this time, although the impedance is temporarily increased so that the current flowing to the relay K1 is reduced temporarily, the relay K1 used has hysteresis properties which prevent the relay K1 from being in an OFF condition again.

Successively when the negative current is supplied from the BRANCH1 of the terminal B, the current flows to the relay K1 by way of the relay K2, the diode D2, the contact k5-2 and the contact k3-1 and another current flows to the relay K2, the diode D2, the diode D5 and the relay K4. At this time, two currents flowing to the relay K1 have the same phases and two currents flowing to the relay K4 have inverse phases. When the potential of the BRANCH1 is gradually decreased, the current flowing to the relay K2 is increased so that the relay K2 is activated. As a result, the contact k2 is switched to "2", and hence the BRANCH2 is separated from the branching unit so as to be grounded to the ground terminal E4.

In such a manner, there is formed a feeding pass from the TRUNK to the BRANCH1, and the BRANCH2 having the shunt trouble is grounded to the ground terminal E4.

A-2.2.3. Shunt Trouble of BRANCH1:

When the system is restarted after the occurrence of shunt trouble where the submarine optical cable of the BRANCH1 is grounded to the sea water, it is possible to form the feeding pass from the TRUNK to the BRANCH2 in the procedure where the BRANCH1 is replaced with the BRANCH2 in case of the shunt trouble of the BRANCH2.

As described above, according to the feeding pass switching circuit shown in FIG. 1, it is possible to form the feeding pass between two terminals, i.e., the TRUNK and either of the BRANCH1 and the BRANCH2.

The start-up procedure of feeding when the plurality of branching units BUs are connected with one another will be now described by reference to the power feeding condition shown in FIG. 2(A). Suppose that the branching units BU1 through BU4 are connected in a manner such that the terminal B of the BRANCH1 of the branching unit BU in the front stage is sequentially connected to the terminal A of the TRUNK of the succeeding branching unit B, and the terminal C of the BRANCH2 is connected to the corresponding branched land stations T2, T3, T5, and T6. That is, the terminal A of the TRUNK of the feeding pass switching circuit in the branching unit BU1 is connected to the land station T1, and the terminal B of the BRANCH1 is connected to the terminal A of the TRUNK of the succeeding branching unit BU2, the terminal C of the BRANCH2 is connected to the land station T2, the terminal B of the BRANCH1 of the branching unit BU2 is connected to the terminal A of the TRUNK of the succeeding branching unit BU3, the terminal C of the BRANCH2 is connected to the land station T3, and likewise the terminal B of the BRANCH1 of the branching unit BU4 is connected to the land station T4.

In such a state, as mentioned in the procedures of "A-1.1. Feeding TRUNK-BRANCH1", the branched land stations T2, T3, T5 and T6 permit the submarine optical cables 2 to 5 respectively connected thereto to be put in an open circuit state, and the land station T1 permits the cable to be grounded. As shown in FIG. 1, since in the initialized state the contacts of the relays are in a state where they are connected to all the terminals A, B and C, the relays K1, K2 and K4 in all the branching units BU1 through 4 are in a state where they are connected in series with one another, wherein when the negative voltage is gradually applied from the land station T4, there occur the same operations as made in the feeding pass switching circuits of the branching units BU1 through BU4, thereby feeding TRUNK-BRANCH1. Then, the negative current is supplied from the branched land stations T2, T3, T5 and T6, thereby realizing the feeding pass switching circuit in FIG. 2(A).

During the operation of the system in a state as illustrated in FIG. 2(A), if trouble occurs between the branching units BU2 and BU3, the land stations are associated with one another to restart feeding by a restart procedure as set forth above so that the power is fed to the branching units BU2 and BU3 by the feeding system as illustrated in FIG. 2(B), thereby making it possible to restart the system in a manner which avoids the troubled portions.

Figure 3:
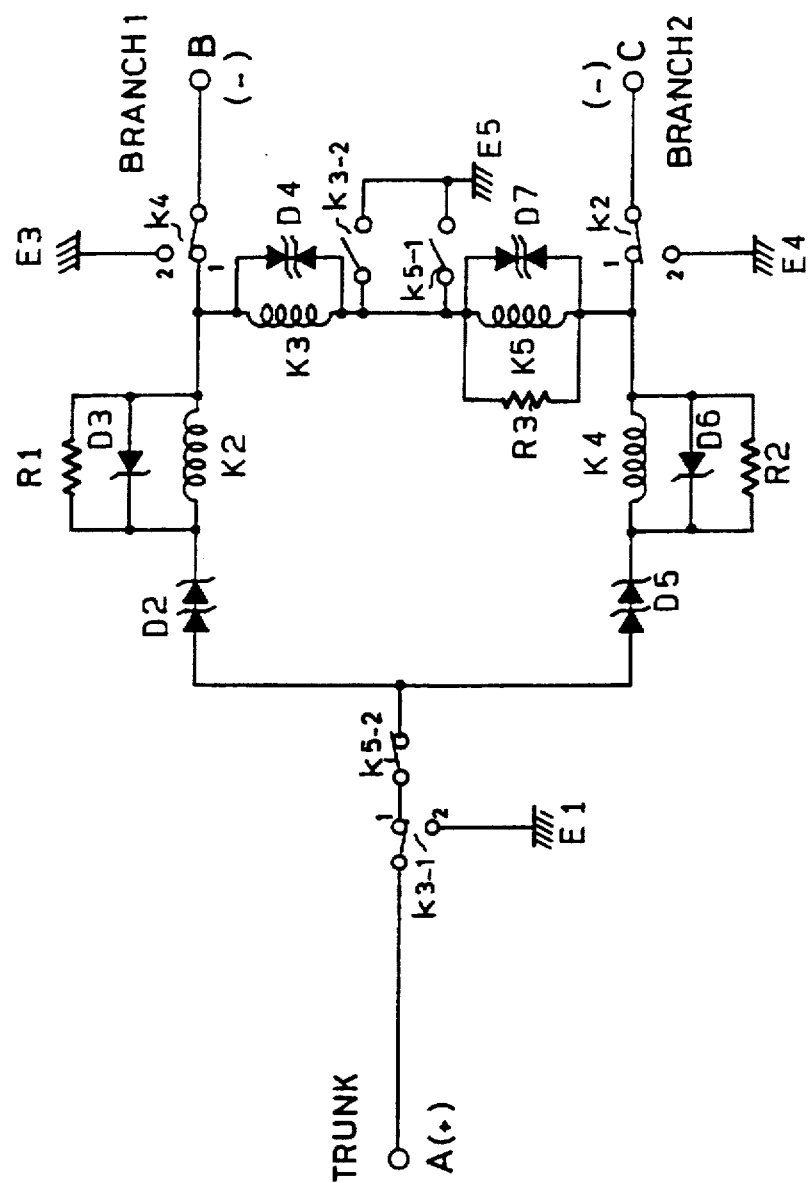
FIG. 3 is a view showing a feeding pass switching circuit according to a second embodiment of the invention.
Figure 4:
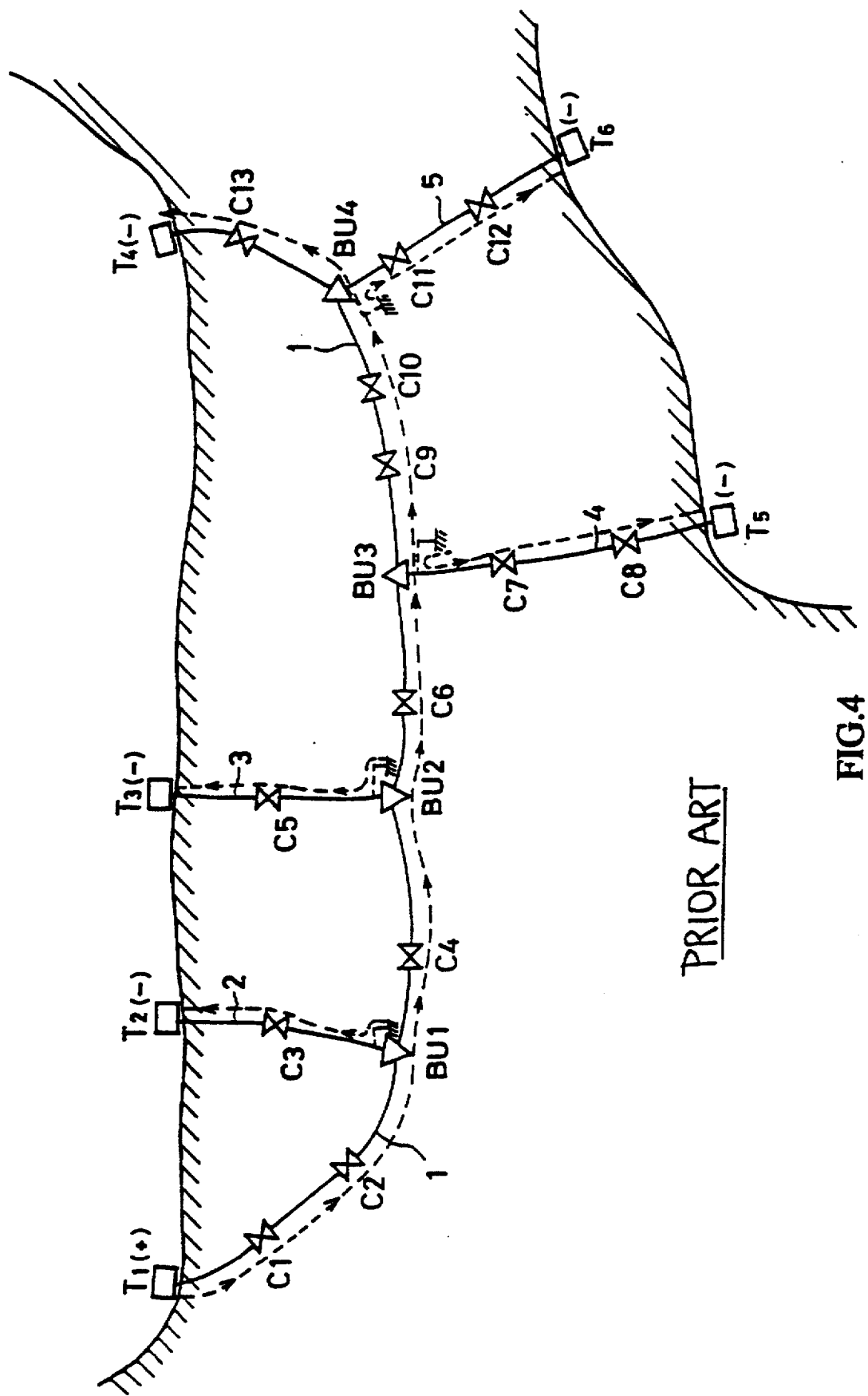
FIG. 4 is a view showing an example of a submarine optical transmission system.
Figure 5:
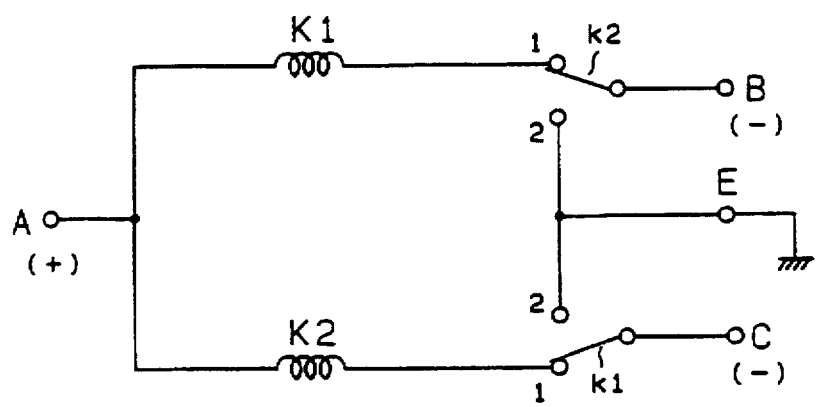
FIG. 5 is a view showing an example of a conventional feeding pass switching circuit.

Second Embodiment (FIG. 3)

FIG. 3 shows a feeding pas switching circuit according to a second embodiment of the present invention. In FIG. 3, the components which are the same as those in FIG. 1 are denoted by the same numerals and the detailed explanation thereof is omitted. The second embodiment reduces the number of components in the first embodiment shown in FIG. 1, by eliminating the relay K1 and the diode D1 connected in parallel with the relay K1. The reduction of the components can enhance reliability and permit the branching unit BU to be miniaturized.

B-1. Start-up Procedure in Normal Operation:

B-1.1. Feeding TRUNK-BRANCH1:

First, the terminal C (BRANCH2) is put in an open circuit state at the land station connected to the terminal C, and the terminal A (TRUNK) is grounded at the land station connected to the terminal A. A negative voltage is increasingly applied from the land station connected to terminal B (BRANCH1). Then, a current starts flowing from the grounded terminal A (TRUNK) to the terminal B (BRANCH1) through two paths: one passing through the relay K2 and another one passing through the relays K4, K5, and K3. Here, the current flowing through the relays K4, K5, and K3 is smaller than the current flowing through the relay K2 because the relays K4, K5, and K3 are connected in series.

More in detail, assuming that the windings of the relays each have a resistance R and the resistors R1, R2, and R3 also have the same resistance R, the resistance of the parallel circuit formed of the relay K2, the Zener diode D3, and the resistor R1, the resistance of the parallel circuit formed of the relay K4, the diode D6, and the resistor R2, and the resistance of the parallel circuit formed of the relay K5, diode D7, and the resistor R3 each becomes substantially R/2, and the resistance of the parallel circuit formed of relay K3 and the diode D4 becomes substantially R. Therefore, if the value of a current flowing into from the TRUNK is I, a current flowing through the relay K2 will be (⅔)·I and a current flowing through the relay K3 will be (⅓)·I. Therefore, the relay k2 is first activated to switch the contact k2, and the BRANCH2 is separated from the branching unit and is grounded at the terminal E4.

Furthermore, a positive voltage is applied to the terminal A (TRUNK) to increase the current flowing from the terminal A to the terminal B. Even if the current increases in this manner, the relays K3 through K5 will not be activated as described below. The voltage between the terminal A and the terminal B is limited to Vz (Zener voltage of the Zener diode D3)+2Vf (forward voltage drop of the diode D2) due to the diode D2 and the Zener diode D3 connected in parallel to the relay K2. Since the voltage drop by the diode D5 is 2Vf, each of the relays K4, K5, and K3 is applied with a voltage such that Zener voltage Vz is divided in correspondence with the impedance of each of the relays. Concretely, the voltages applied to the relays K4 and K5 are Vz/4 each and the voltage applied to the relay K3 is Vz/2. Therefore, using a relay that is not activated in its characteristics at half of the Zener voltage Vz of the Zener diode D3 will not activate these relays. Thus, feeding the TRUNK and the BRANCH1 can be achieved.

B-1.2. Feeding TRUNK-BRANCH2:

Conversely to the above, the BRANCH1 is put in an open circuit, the TRUNK is grounded, a negative current is supplied from the BRANCH2, and afterward, a positive current is supplied from the TRUNK, so that the power is fed to the TRUNK and BRANCH2 in the same manner as above.

B-1.3. Feeding BRANCH1-BRANCH2:

First, the TRUNK is put in an open circuit and the BRANCH2 is grounded, and in this state a positive current is gradually supplied from the BRANCH1, and then a current flowing from the BRANCH1 runs through a path formed of the relay K3 and K5. Since the sensitivity of the relay K5 is decreased by the resistor R3, the relay K3 is activated and the contact k3-2 is grounded at terminal E5. Thereby, the current flowing through the relay K3 is increased to put the relay K3 in a self-holding state. And, the contact k3-1 is switched to "2" and the TRUNK is grounded at the ground terminal E1.

Next, feeding a negative current from the BRANCH2 will flow a current through the contact k3-2, the relay K5, and the contact k2 from the ground terminal E5 to activate the relay K5. Thereby the contact k5-1 is made conductive to be doubly grounded at the ground terminal E5. Furthermore, the TRUNK is doubly separated by the contact k5-2.

Next, the direction of the current supplied from the BRANCH1 is reversed to flow a negative current from the BRANCH1. Here, although the relay K3 is temporarily inactive since the contact k5-1 and k5-2 are in operation, the state is not changed thereby and the relay K3 resumes operation by the negative current supplied from the BRANCH1. TRUNK, the BRANCH1, and the BRANCH2 are grounded in the branch unit in this manner and the power is fed to each of them from the single terminal.

B-2. Restart Procedure after Trouble:

B-2.1. In Case of Open Circuit Trouble:

In case a submarine optical fiber cable connected to the TRUNK, the BRANCH1, or the BRANCH2 is cut, a feeding path can be reformed by applying any one of the foregoing start-up procedures in normal operation that is suited to the state of the present trouble.

B-2.2. In Case of Shunt Trouble:

B-2.2.1. Shunt Trouble of TRUNK:

If there occurs a shunt trouble wherein the TRUNK is short-circuited by the sea water and the terminal A is grounded to the sea water, first the BRANCH2 connected to the terminal C is put in an open circuit state and a positive current sufficient to activate the relays is supplied from BRANCH2 through the terminal B. Next, by feeding a negative current from the BRANCH2, the TRUNK can be separated so as to feed the BRANCH1 and the BRANCH2 in the same manner as in B-2.1 above.

B-2.2.2. Shunt Trouble of the BRANCH2:

If a shunt trouble occurs at the BRANCH2, the BRANCH1 is put in an open circuit on restarting, and a constant positive current is supplied from the TRUNK. If a relay activating current is Ic, a current of, for example, 2Ic is applied. The current flows through the terminal A and the contact k3-1 and the contact k5-2 via a path passing the Zener diode D5 and the relay K4, and another path passing the Zener diode D2, the relay K2, the relay K3, and the relay K5 to the contact k2 and the terminal C, which is grounded to the sea water from the BRANCH2 having a shunt trouble. The current flowing through the former and latter path are (⅘)·Ic and (⅖)·Ic, respectively. Here, none of the relays are activated.

In such a state, feeding a negative current from the BRANCH 1 of the terminal B flows through two current paths: one passing through the relay K4, the diode D5, the diode D2, and the relay K2; another one passing through the relay K5 and the relay K3. Here, although the two currents flowing through the relay K2 are in phase, the two currents flowing through relay K4, relay K3, and relay K5 are in the reverse phase, and increasingly feeding a positive current from the BRANCH1 can activate the relay K2. If the current applied at the terminal B is (⅗)·Ic, the current flowing through the relay K2 will be Ic, the current flowing through relay K4 will be 0, the current flowing through the relay K3 will be (⅖)·Ic, the current flowing through the relay K5 will be (⅕)·Ic, and only the relay K2 will be activated. Thereby, the contact k2 is switched to "2" to ground the BRANCH2 at the ground terminal E4.

B-2.2.3. Shunt Trouble of BRANCH1:

If a shunt trouble occurs wherein the submarine cable of the BRANCH1 is short-circuited by being grounded to the sea water, restarting will be performed by replacing the BRANCH2 with the BRANCH1 in the case of the shunt trouble of the BRANCH2 described above; thus forming a feeding path from the TRUNK to the BRANCH2.

Furthermore, the value of the resistors R1 to R3 are made identical to the resistance of coils of the relays; however, it can be set to other values. And, interposing a resistor in parallel to the relay K3 can change the value of current at restarting in the shunt trouble of the BRANCH.

In the circuit diagrams illustrated in FIG. 1 and FIG. 3 in the preferred embodiments, only fundamental circuits are shown, and it is necessary to connect the nodes by means of high-resistance resistors if a minute current or capacity is desired to be measured.

What is claim is:

1. A feeding pass switching circuit comprising:

first, second and third terminals respectively connected to a feeding pass;

a first relay having one end connected to said first terminal, said first relay being activable by a current flowing thereto from said first terminal;

a second relay connected between said second terminal and a first diode connected to an other end of said first relay said second relay being activable by a current flowing in the same direction as that flowing to said first relay;

a third relay connected to said second terminal, said third relay being activable by a current flowing in either direction;

a fourth relay connected between said third terminal and a second diode connected to said other end of said first relay, said fourth relay being activable only by a current flowing in the same direction as that flowing to said first relay and having a sensitivity lower than that of said first relay;

a fifth relay connected between said third terminal and said third relay, said fifth relay being activable by a current flowing in either direction and having a sensitivity lower than that of said third relay;

said third relay being disconnected from said fifth relay when said first relay is activated;

said third terminal being separated from said feeding pass switching circuit and grounded when said second relay is activated;

a connection point between said third relay and said fifth relay being grounded and said other end of said first relay being separated from said feeding pass switching circuit and grounded when said third relay is activated;

said second terminal being separated from said feeding pass switching circuit and grounded when said fourth relay is activated; and a connection point between said third relay and said fifth relay being grounded and said other end of said first relay being separated from said feeding pass switching circuit when said fifth relay is activated.

2. A feeding pass switching circuit comprising:

first, second and third terminals respectively connected to a feeding pass;

a first relay connected between a first diode connected to said first terminal and said second terminal, said first relay being activable only by a current flowing to said second terminal and having a sensitivity lower than that of a second relay;

said second relay being connected to said second terminal and being activable by a current flowing in either direction;

a third relay connected between a second diode connected to said first terminal and said third terminal, said third relay being activable only by a current flowing to said third terminal and having a sensitivity lower than that of said second relay;

a fourth relay connected between said third terminal and said second relay, said fourth relay being activable by a current flowing in either direction and having a sensitivity lower than that of said first relay;

said third terminal being disconnected from said feeding pass switching circuit and grounded when said first relay is activated;

a connection point between said second relay and fourth relay being grounded and said first terminal being separated from said feeding pass switching circuit and grounded when said second relay is activated;

said second terminal being separated from said feeding pass switching circuit and grounded when said third relay is activated; and a connection point between said second relay and said fourth relay being grounded and said first terminal being separated from said feeding pass switching circuit when said fourth relay is activated.

* * * * *